US011091036B2

(12) United States Patent
Wengelnik et al.

(10) Patent No.: US 11,091,036 B2
(45) Date of Patent: Aug. 17, 2021

(54) METHOD FOR REPRESENTING ITEMS OF INFORMATION IN A MEANS OF TRANSPORTATION AND INSTRUMENT CLUSTER FOR A MOTOR VEHICLE

(75) Inventors: Heino Wengelnik, Wolfsburg (DE); Will Specks, Wolfsburg (DE); Mathias Kuhn, Berlin (DE); Rainer Dehmann, Berlin (DE); Heiner Bartoszewski, Calberlah (DE)

(73) Assignee: VOLKSWAGEN AG, Wolfsburg (DE)

( * ) Notice: Subject to any disclaimer, the term of this patent is extended or adjusted under 35 U.S.C. 154(b) by 2748 days.

(21) Appl. No.: 11/911,600

(22) PCT Filed: Apr. 11, 2006

(86) PCT No.: PCT/EP2006/003333
§ 371 (c)(1),
(2), (4) Date: Feb. 8, 2008

(87) PCT Pub. No.: WO2006/108617
PCT Pub. Date: Oct. 19, 2006

(65) Prior Publication Data
US 2008/0161997 A1 Jul. 3, 2008

(30) Foreign Application Priority Data

Apr. 14, 2005 (DE) .................. 10 2005 017 313.6

(51) Int. Cl.
*B60K 35/00* (2006.01)
*B60K 37/02* (2006.01)
(Continued)

(52) U.S. Cl.
CPC .............. *B60K 35/00* (2013.01); *B60K 37/02* (2013.01); *G01C 21/367* (2013.01);
(Continued)

(58) Field of Classification Search
CPC ... G06F 3/0482; G06F 3/04815; B60K 35/00; B60K 37/02; B60K 2370/11;
(Continued)

(56) References Cited

U.S. PATENT DOCUMENTS 4,740,780 A * 4/1988 Brown ................... G02B 27/01
345/7
4,818,048 A * 4/1989 Moss ..................... B60K 35/00
345/7
(Continued)

FOREIGN PATENT DOCUMENTS

DE 37 12 170 2/1989
DE 37 40 557 6/1989
(Continued)

OTHER PUBLICATIONS

Definition from WhatIs—Stereoscopy, accessed Aug. 6, 2012, 2 pages.*
(Continued)

*Primary Examiner* — Yongjia Pan
(74) *Attorney, Agent, or Firm* — Hunton Andrews Kurth LLP

(57) ABSTRACT

In a method for displaying items of information in a transportation device, the items of information are displayed in the form of hierarchical menu structures. A device for displaying items of information includes a control unit and a display unit for the stereoscopic and/or autostereoscopic display of items of information. In the method, the display is implemented stereoscopically, at least two different menus or menu items being displayed to the viewer at different distances. The instrument cluster includes the placement of a mask in front of the display of a display unit, the mask
(Continued)

modifying the light emission of the light emitted by the display so as to result in a display of autostereoscopic images.

32 Claims, 21 Drawing Sheets

(51) Int. Cl.
  *G01C 21/36* (2006.01)
  *G02B 30/00* (2020.01)
(52) U.S. Cl.
  CPC ..... *G01C 21/3614* (2013.01); *G01C 21/3697* (2013.01); *G02B 30/00* (2020.01); *B60K 2370/11* (2019.05); *B60K 2370/155* (2019.05); *B60K 2370/1531* (2019.05)
(58) Field of Classification Search
  CPC ...... B60K 2370/155; B60K 2370/1531; G02B 30/00; G01C 21/3614; G01C 21/367; G01C 21/3697
  USPC ....... 715/700, 716, 764, 771, 782, 834, 835, 715/836, 848, 850, 851, 852, 970; 701/1; 359/23, 376, 458, 462–477, 630
  See application file for complete search history.

(56) References Cited

U.S. PATENT DOCUMENTS

| | | | | |
|---|---|---|---|---|
| 4,908,611 A * | 3/1990 | Iino | ............... | B60R 11/02 340/980 |
| 4,961,625 A * | 10/1990 | Wood | ............... | G02B 27/01 359/630 |
| 5,051,735 A * | 9/1991 | Furukawa | ............... | G02B 27/01 340/905 |
| 5,440,428 A * | 8/1995 | Hegg | ............... | B60K 37/02 359/630 |
| 5,724,492 A * | 3/1998 | Matthews, III | ....... | G06F 3/0482 345/419 |
| 5,748,347 A * | 5/1998 | Erickson | ............... | 359/23 |
| 5,757,268 A * | 5/1998 | Toffolo | ............... | B60K 35/00 340/459 |
| 5,835,094 A * | 11/1998 | Ermel | ............... | G06T 17/00 345/419 |
| 5,847,704 A * | 12/1998 | Hartman | ............... | B60R 16/0231 715/764 |
| 5,883,739 A * | 3/1999 | Ashihara et al. | ............... | 359/462 |
| 5,898,433 A * | 4/1999 | Hijikata | ............... | G09G 5/14 715/782 |
| 5,929,853 A * | 7/1999 | Guha | ............... | G06T 15/00 715/764 |
| 5,977,975 A | 11/1999 | Mugura et al. | | |
| 5,991,073 A | 11/1999 | Woodgate et al. | | |
| 5,995,104 A * | 11/1999 | Kataoka et al. | ............... | 715/848 |
| 6,094,216 A | 7/2000 | Taniguchi et al. | | |
| 6,175,802 B1 * | 1/2001 | Okude et al. | ............... | 701/431 |
| 6,222,465 B1 * | 4/2001 | Kumar | ............... | G06F 3/017 341/20 |
| 6,229,542 B1 * | 5/2001 | Miller | ............... | G06F 3/04815 715/782 |
| 6,233,071 B1 * | 5/2001 | Orr et al. | ............... | 359/23 |
| 6,243,054 B1 * | 6/2001 | DeLuca | ............... | G02B 27/22 345/419 |
| 6,278,418 B1 * | 8/2001 | Doi | ............... | G09G 3/003 345/156 |
| 6,356,812 B1 * | 3/2002 | Cragun | ............... | B60K 35/00 340/990 |
| 6,377,238 B1 * | 4/2002 | McPheters | ............... | G03H 1/22 345/156 |
| 6,412,949 B1 * | 7/2002 | Halldorsson | ............... | 353/8 |
| 6,437,759 B1 * | 8/2002 | Turner | ............... | G09B 9/302 345/8 |
| 6,480,192 B1 * | 11/2002 | Sakamoto et al. | ............... | 345/419 |
| 6,512,892 B1 * | 1/2003 | Montgomery et al. | ....... | 396/326 |
| 6,667,726 B1 * | 12/2003 | Damiani | ............... | B60K 35/00 340/461 |
| 6,714,327 B1 | 3/2004 | Abersfelder et al. | | |
| 6,753,847 B2 * | 6/2004 | Kurtenbach | ....... | G02B 27/2271 345/156 |
| 6,898,266 B2 * | 5/2005 | Griffith | ............... | G06T 15/08 378/21 |
| 6,945,346 B2 * | 9/2005 | Massen | ............... | B60K 31/0008 180/169 |
| 6,980,176 B2 | 12/2005 | Matsumoto et al. | | |
| 7,043,701 B2 * | 5/2006 | Gordon | ............... | G06F 3/04815 715/757 |
| 7,054,045 B2 * | 5/2006 | McPheters | ............... | G03H 1/0005 341/23 |
| 7,178,111 B2 * | 2/2007 | Glein | ............... | G06F 3/0481 715/782 |
| 7,245,310 B2 * | 7/2007 | Kawahara | ............... | G06F 3/04815 715/782 |
| 7,260,784 B2 * | 8/2007 | Crichton | ............... | G06F 3/1454 715/750 |
| 7,274,412 B2 * | 9/2007 | Blanchard | ............... | 349/15 |
| 7,375,728 B2 * | 5/2008 | Donath | ............... | B60R 1/00 345/427 |
| 7,558,420 B2 * | 7/2009 | Era | ............... | 382/154 |
| 7,580,186 B2 * | 8/2009 | Mather et al. | ............... | 359/463 |
| 7,669,543 B2 | 3/2010 | Soltendieck et al. | | |
| 7,702,434 B2 * | 4/2010 | Dupont | ............... | B60K 37/02 205/223 |
| 7,817,168 B2 * | 10/2010 | Nagiyama | ............... | G06F 3/0482 345/661 |
| 7,848,882 B2 * | 12/2010 | Kawai | ............... | B60K 35/00 340/438 |
| 7,918,100 B2 * | 4/2011 | Breed | ............... | B60H 1/00742 165/203 |
| 7,940,285 B2 * | 5/2011 | Would | ............... | G06F 3/0482 345/629 |
| 7,966,577 B2 * | 6/2011 | Chaudhri et al. | ............... | 715/835 |
| 8,248,458 B2 * | 8/2012 | Schowengerdt et al. | ....... | 348/43 |
| 9,575,627 B2 * | 2/2017 | Kuenzner | ............... | B60K 35/00 |
| 2001/0003835 A1 * | 6/2001 | Watts | ............... | G06F 3/0486 719/318 |
| 2002/0027678 A1 | 3/2002 | Halldorsson et al. | | |
| 2002/0030702 A1 * | 3/2002 | Gould | ............... | G06F 3/04815 715/850 |
| 2002/0033849 A1 * | 3/2002 | Loppini | ............... | G06F 3/04815 715/848 |
| 2002/0080043 A1 * | 6/2002 | Damiani | ............... | B60K 35/00 340/815.4 |
| 2002/0186228 A1 | 12/2002 | Kobayashi et al. | | |
| 2002/0186348 A1 * | 12/2002 | Covannon | ............... | G02B 27/225 351/240 |
| 2003/0142136 A1 * | 7/2003 | Carter | ............... | G06F 3/04815 715/782 |
| 2003/0179198 A1 * | 9/2003 | Uchiyama | ............... | H04N 13/383 345/427 |
| 2003/0210228 A1 * | 11/2003 | Ebersole | ............... | G02B 27/017 345/157 |
| 2004/0008412 A1 * | 1/2004 | Jiang | ............... | G02B 27/0101 359/487.02 |
| 2004/0048607 A1 * | 3/2004 | Kim | ............... | H04M 1/72469 455/418 |
| 2004/0100479 A1 * | 5/2004 | Nakano | ............... | G06F 1/1626 715/700 |
| 2004/0128012 A1 * | 7/2004 | Lin | ............... | G06F 3/011 700/100 |
| 2004/0150674 A1 * | 8/2004 | Takahashi | ............... | B60K 35/00 715/810 |
| 2004/0233222 A1 * | 11/2004 | Lee et al. | ............... | 345/621 |
| 2004/0254699 A1 * | 12/2004 | Inomae et al. | ............... | 701/36 |
| 2005/0002074 A1 * | 1/2005 | McPheters | ............... | G03H 1/0005 359/15 |
| 2005/0012599 A1 * | 1/2005 | DeMatteo | ............... | B60K 35/00 340/425.5 |
| 2005/0030256 A1 * | 2/2005 | Tubidis et al. | ............... | 345/30 |

(56) References Cited

U.S. PATENT DOCUMENTS

| | | | |
|---|---|---|---|
| 2005/0154505 A1* | 7/2005 | Nakamura | G01C 21/365 701/1 |
| 2005/0254702 A1* | 11/2005 | Era | 382/154 |
| 2005/0280602 A1 | 12/2005 | Tzschoppe et al. | |
| 2005/0286757 A1* | 12/2005 | Zitnick et al. | 382/154 |
| 2006/0012675 A1* | 1/2006 | Alpaslan | G06F 3/011 348/51 |
| 2006/0031776 A1* | 2/2006 | Glein | G06F 3/0481 715/779 |
| 2006/0092521 A1* | 5/2006 | Birman et al. | 359/630 |
| 2006/0095200 A1* | 5/2006 | Ebi | G01C 21/3664 701/532 |
| 2006/0161861 A1* | 7/2006 | Holecek | G06F 3/0481 715/782 |
| 2006/0212833 A1* | 9/2006 | Gallagher | G06T 11/206 715/848 |
| 2006/0282204 A1* | 12/2006 | Breed | G01G 23/3728 701/49 |
| 2006/0285206 A1 | 12/2006 | Tzschoppe | |
| 2007/0057781 A1* | 3/2007 | Breed | B60K 35/00 340/457.1 |
| 2007/0130522 A1* | 6/2007 | Mansell | G06F 3/0482 715/744 |
| 2008/0117289 A1* | 5/2008 | Schowengerdt et al. | 348/46 |
| 2008/0246757 A1* | 10/2008 | Ito | 345/419 |
| 2009/0128498 A1* | 5/2009 | Hollemans | G06F 3/041 345/173 |
| 2011/0107220 A1* | 5/2011 | Perlman | H04N 19/166 715/720 |
| 2012/0200607 A1* | 8/2012 | Ross et al. | 345/676 |
| 2014/0168205 A1* | 6/2014 | Naveh | G06T 19/20 345/419 |

FOREIGN PATENT DOCUMENTS

| | | |
|---|---|---|
| DE | 197 04 740 | 8/1998 |
| DE | 199 41 969 A1 | 12/2000 |
| DE | 199 41 955 | 3/2001 |
| DE | 100 01 988 | 7/2001 |
| DE | 100 03 326 | 8/2001 |
| DE | 102 25 385 | 1/2003 |
| DE | 101 18 765 A1 | 5/2003 |
| DE | 102 24 016 | 12/2003 |
| DE | 600 03 578 T2 | 5/2004 |
| DE | 103 03 792 | 8/2004 |
| DE | 103 09 194 | 10/2004 |
| DE | 103 20 530 | 11/2004 |
| DE | 10 2004 022 494 A1 | 12/2004 |
| DE | 103 33 745 A1 | 3/2005 |
| EP | 0 891 887 | 1/1999 |
| EP | 1085769 A2 * | 3/2001 |
| EP | 1 098 498 | 5/2001 |
| EP | 1 462 297 | 9/2004 |
| GB | 2 212 964 | 8/1989 |
| GB | 2 405 546 | 3/2005 |
| JP | 09-62473 A | 3/1997 |
| JP | 2000-075991 A | 3/2000 |
| JP | 2003-137006 A | 5/2003 |
| JP | 2004-291731 A | 10/2004 |
| JP | 2004-317412 A | 11/2004 |
| KR | 10-2004-0082827 A | 9/2004 |
| WO | 01/29644 A2 | 4/2001 |
| WO | WO2003096104 A1 * | 11/2003 |

OTHER PUBLICATIONS

U.S. Appl. No. 60/599,454 obtained from Global Dossier, filed Aug. 6, 2004, 51 pages (Year: 2004).*

International Search Report, PCT International Patent Application No. PCT/EP2006/003333, dated Nov. 9, 2006.

Written Opinion of the International Searching Authority, PCT International Patent Application No. PCT/EP2006/003333, dated Nov. 9, 2006 (English-language translation provided).

* cited by examiner

NEXT GAS STATION
▶ ARAL Adershe... 0,2km
ESSO Neuer W... 2,1km
OIL Neuer Weg 2,7km
ARAL Wolfen... 9,8km trip 412.3 | 18.5°C | 17968 km

FIG. 5

METHOD FOR REPRESENTING ITEMS OF INFORMATION IN A MEANS OF TRANSPORTATION AND INSTRUMENT CLUSTER FOR A MOTOR VEHICLE

FIELD OF THE INVENTION

The present invention relates to a method for representing items of information in a transportation device, in which the items of information are represented in the form of hierarchical menu structures. Furthermore, the present invention relates to a device for this purpose, the device including a control unit and a display unit for the stereoscopic and/or autostereoscopic representation of items of information. In addition, the present invention relates to an instrument cluster for a motor vehicle for representing items of information in close proximity to the primary visual range of the driver using a display unit which has a display and a control unit for controlling the display. The present invention relates to a motor vehicle having such an instrument cluster or such a device for representing items of information.

BACKGROUND INFORMATION

There are various information and communication areas in a motor vehicle to which display instruments are assigned. They are provided to inform the driver and the passengers. Furthermore, they can assist the driver in the navigation or communication with the outside world. In particular, the display can visually represent vehicle data pertaining to the traffic or operation. The so-called instrument cluster is disposed near the driver's primary visual field. It is typically located in the cockpit behind the steering wheel and is visible through an opening in the steering wheel. In particular, it serves to display the speed, the fuel level, radiator temperature and other information items of the motor vehicle relating to its operation. Radio and audio functions are able to be displayed as well. Finally, menus for telephone, navigation, telematic services and multi-media applications may be shown. Liquid crystal displays of different designs are typically utilized as displays.

German Published Patent Application No. 100 01 988, for instance, describes an instrument cluster for the display of data relating to the operation and/or traffic. In order to better accommodate the multitude of offered information, German Published Patent Application No. 103 03 792 describes a perspective representation of three-dimensional elements.

A vehicle usually is equipped with a multi-function display in the center console or above the center console as additional display device. Such a multi-function operating element is described in German Published Patent Application No. 199 41 955, for instance.

Hierarchical menu structures are often used to display the multitude of operating and display options in a clearly laid out manner. A menu displays different menu items and possibly graphics or icons assigned to the menu items. Once a menu item has been selected, a sub-menu appears, which includes additional sub-menu items. This format may be continued over several hierarchical levels. In addition, instead of a sub-menu, a menu item that represents information assigned to the menu item may be assigned a particular display image.

If such menu structures are used in a transportation device, in particular a motor vehicle, the driver's attention should not be distracted by absorbing the displayed information and operating the display unit. The information display should therefore appear as intuitive as possible. Three-dimensional representations of objects are preferred over two-dimensional projections of three-dimensional objects.

Various technologies have been developed to realize three-dimensional representations in display instruments. The following documents describe holographic display devices for motor vehicles: German Published Patent Application No. 37 40 557, German Published Patent Application No. 197 04 740, U.K. Published Patent Application No. 2 212 964, and European Published Patent Application No. 0 891 887. However, holographic display devices have the disadvantage that the configuration of the display devices is very complex and the three-dimensional representation not very realistic.

Certain so-called autostereoscopic display devices for motor vehicles are conventional. In contrast to perspective, two-dimensional displays, one eye perceives a slightly different image than the other. This results in a real three-dimensional representation. An autostereoscopic display requires no special devices such as glasses or the like to produce the three-dimensional effect when viewing the display.

German Published Patent Application No. 102 25 385 describes a stereoscopic display device for a vehicle. The device includes a first display, which displays actual images to the driver. Furthermore, the device includes a half mirror, which is disposed in front of the first display. Via a total-reflection mirror, images generated by a second display are displayed on the half mirror where they appear as virtual images. The arrangement is selected such that, ultimately, it results in a display of a virtual image at a position that, in the depth direction, is displayed at a distance from the position of an actual image displayed on the first display, such that the real image and the virtual image allow the display of a three-dimensional, stereoscopic image. However, one disadvantage of this device is that it requires relatively much space.

Furthermore, a stereoscopic display system is described in German Published Patent Application No. 37 12 170, in which images are projected onto the windshield of the motor vehicle with the aid of imaging optics. This realizes a so-called head-up display. This system also requires relatively much space and, furthermore, is not suitable for the display in an instrument cluster.

SUMMARY

Example embodiments of the present invention provide a method and a device in which the representation of information items in a transportation device, in particular a motor vehicle, is improved. Furthermore, a cluster instrument of the type mentioned in the introduction is to be provided, which allows a better display of information in a motor vehicle and which requires little space.

In a method for the display of information items in a transportation device, the menus or menu items of the hierarchical menu structures are represented stereoscopically, at least two different menus being shown to the viewer at different distances. It is apparent that the viewer is able to absorb the information content in an especially rapid manner if the menu or menu items is/are represented in this fashion. Furthermore, the three-dimensional representation also allows an intuitive operation in spaces.

The menus or menu items may be displayed in a plane that, in relation to a reference plane, is offset towards the viewer. Such menus or menu items that are offset relative to the viewer may be represented semi-transparently, for example, so that rear menu planes still remain visible. The reference plane is defined by, for instance, a physical display plane, which allows the stereoscopic representation. Furthermore, menus or menu items may be displayed in a plane that is offset away from the viewer in relation to the reference plane. A menu offers the user one or a plurality of menu items for selection. In addition, individual menus or also menu items may also include objects such as graphics, etc., which are meant to illustrate the contents of the menu or menu item. These objects, too, may be displayed in a plane that is offset towards or away from the viewer relative to the reference plane. By modifying the clearance of the menu planes or menu items or the objects represented in menus, an assignment with regard to the importance or timeliness of the menu, the menu item or the object is able to be produced. This makes it easier for the viewer to rapidly understand the information relevant for him. Objects or menus or menu items that are of low relevance or importance for the viewer at a particular time may, for instance, be displayed in the plane that is offset away from the viewer. In addition, they may be shown blurred. The sharp focusing is therefore implemented in a context-related or context-controlled manner. This, too, makes it easier to understand the displayed information more readily.

The variations in the display planes, the varying of the transparency or the focus may be implemented via animations, so that, for instance, a menu makes it way to the front or the back, becomes more or less focused in the process, and possibly also changes its transparency.

Upon selection of a menu item, the submenu assigned to this menu item may be opened in a plane that is rotated about an axis until the plane of the submenu is shown in a plane that is parallel to the reference plane. That is to say, the submenu is rotated toward the viewer, until the viewer is able to view it in a plane that is elevated three-dimensionally. In doing so, the impression may be created that the submenu is on the rear side of the hierarchically higher menu. Additional information, details, memos or settings, for example, which are to be displayed upon selection of the menu item, may be shown on the rear side. The axis of rotation may be aligned vertically or horizontally. However, it may also be at an oblique angle.

The menus or menu items may appear on the surfaces of a stereoscopically represented cube, on the inside areas of a stereoscopically represented hollow cube, on the surface of a stereoscopically represented ball, on a stereoscopically represented, rotating cylinder, on a stereoscopically represented, rotating ring and/or on the sides of a stereoscopically represented open book. Furthermore, it is possible to display the menu structure in the form of a planetary system or as an inside or outside view of a window. In the window representation, the display of the window sill, for example, may be used as support for a status line for favorites or for an information table. Furthermore, in addition to the menu, a so-called avatar may be employed, which guides the viewer through the menus, gives warnings or selects the menu items as a surrogate.

In addition, the menus may be displayed in a personal space such as a house, a car or other rooms. If special destinations (points of interest) of a navigation system are displayed, a detailed immersion in the spaces assigned to these points with the aid of the three-dimensional representation is possible upon selection of these destinations. For instance, if a supermarket is a special destination, then the interior of the supermarket may be displayed in three dimensions upon selection of this destination.

If a menu relates to a park distance control, then rendered abstracted data may be represented three-dimensionally in order to give the driver the most vivid and easily comprehensible image possible of the parking slot.

Due to the three-dimensional representation, operating elements may be represented stereoscopically as well. This allows an entire cockpit to be implemented virtually on a display, the real three-dimensional elements finding virtual three-dimensional counterparts.

Furthermore, the hierarchical menu structures may be represented in an "onion" model in which the menus or objects are placed around the instantaneous menu or object.

The display for an automatic distance control may be assigned to a menu. In this case, the distance to the vehicle that is driving ahead is represented three-dimensionally, and it is also possible to display distance information. This makes it possible to illustrate the distance with respect to the preceding vehicle in an especially clear manner since the distance is not reproduced in the form of a perspective representation, but as an actual, three-dimensional distance.

The display for the route guidance of a navigation system may be assigned to a menu. In this case, the route may be represented in three dimensions from a bird's-eye perspective. Furthermore, the manner in which a driver sees is able to be represented very clearly in three dimensions, so that the transfer of the display of the navigation system to the real environment is facilitated.

If warnings are assigned to specific menus, then these are able to be displayed the larger or more conspicuously and, in particular, the closer to the viewer the greater their importance. The accommodation time in the method may be utilized to initially display only a few, in particular only the important, items of information, with more information being added later on. Warnings may always be shown in the foreground of the visual field, i.e., in front of the menus. If appropriate, the warnings may also be displayed semi-transparently, so that the menus in the background remain visible.

In addition, to reduce the accommodation time, objects or menus from the far-distance visual field may move into the near-visual range. It is also possible to initially show objects or menus in two dimensions, and then to zoom out of or into the third dimension.

For navigation within the menu structures, a three-dimensional mouse may be implemented. The mouse is either freely movable in space or allows only a depth movement in the viewer's line of sight.

Menu items may be selected by gestures. The gestures may be detected by infrared sensors, for example, and implemented into the menu control. Such a control may be provided in device(s) since this dispenses with the need to touch a particular key, etc., in a precise spot. A gesture for turning the page in a book, for instance, is sufficient to obtain the display of a new menu.

The menu items may be selected by touching a display for the stereoscopic representation. In doing so, the selection may be made by touching the display at a button displayed virtually and stereoscopically, the button being displayed at an offset away from the viewer after touching it. The pressing of an actual button thereby finds its counterpart in the three-dimensional representation on the display.

If information is displayed on a surface that is aligned perpendicular to a viewer's line of sight, then the detailed information associated with this information may be displayed on the rear side of this surface, the rear side becoming visible to the viewer by a 180° stereoscopic rotation of the surface.

If information that concerns a component of the transportation device is represented, then the stereoscopic display of this component may move into the viewer's visual range from the direction of the physical component in the transportation device. It is thus very easy for the viewer to understand which component is being shown.

The three-dimensional movements of an operating device may be reproduced in three dimensions via the stereoscopic representation. Optical feedback of actually executed three-dimensional movements in three-dimensional space thus takes place. This makes it easier to actuate the operating device.

At least the speed and/or the engine speed may be able to be indicated stereoscopically in the form of a dial-type gauge. Furthermore, the radiator temperature and/or the fluid level of the tank, for example, may be indicated stereoscopically in the form of a dial-type gauge. If the transportation device or a part thereof is shown in a menu, then this may be done by a stereoscopic eye point representation. View from above, namely an oblique rear or oblique front view, may be provided.

A menu may include a stereoscopic representation of the interior of the transportation device, in which lighting, audio and climate control sources are shown in the interior. This allows an especially uncomplicated control of the wide variety of lighting, audio and/or climate control sources in the transportation device.

A menu may include the stereoscopic representation of a compass. The compass may have a dial, which is stereoscopically represented and viewed obliquely from above. This considerably enhances the readability of the compass since an assignment of the compass with regard to the driving environment is facilitated.

All three-dimensional representations may be implemented autostereoscopically. In other words, no additional aids such as glasses are required for the three-dimensional effect of the representation. This is particularly important when using the present method in a motor vehicle since the viewer's eyes constantly switch between the actual driving environment and the three-dimensionally reproduced information.

In a device for displaying information in a transportation device, the control unit is able to calculate the display of the menus such that the display unit may represent at least two different menus or menu items at different distances for the viewer. The device may therefore be suitable for implementing the afore-described method. The control unit generates the data required for the autostereoscopic representation of menus or objects.

Furthermore, a motor vehicle may include such a device for displaying items of information. The display unit in this motor vehicle is disposed behind a steering wheel in the driver's line of sight. The display unit is thus situated at the location of a conventional instrument cluster.

A mirror may be provided, which is disposed so as to reflect the stereoscopic display of the display unit in a viewer's direction. The mirror may be semi-transparent and disposed between the driver and additional display instruments. In this case, the three-dimensional display may appear in front of a conventional instrument cluster and possibly supplement it. The display unit may be disposed above or below the mirror. Furthermore, the display unit may be situated such that its display is mirrored in the viewer's direction via the windshield. The windshield acts as a semi-transparent mirror in this case. An optical system for extending the optical path may also be disposed between the display unit and the windshield. In this case, a so-called head-up display is implementable.

A motor vehicle may have an operating device that is actuable three-dimensionally and connected to the control unit. According to this arrangement, the control unit controls the display unit such that the three-dimensional actuation of the operating device is reproduced autostereoscopically.

In a cluster instrument for a motor vehicle for representing items of information in close proximity to the driver's primary visual range, a mask is disposed in front of the display and modifies the light emission of the light radiated by the display such that autostereoscopic images are able to the represented. Providing the instrument cluster in a motor vehicle with an autostereoscopic display makes the information of the instrument cluster freely programmable in a variety of different manners and, in particular, allows it to be displayed in a manner that is very easy to comprehend by the viewer due to the three-dimensional representation. In addition, such an instrument cluster requires considerably less space than a conventional instrument cluster. This is because the autostereoscopic representation is able to be implemented using a, e.g., conventional, flat display and having a mask for separating the various images. Such a mask requires virtually no space. The control unit generating the data suitable for an autostereoscopic display takes up as much space as a conventional control device. As a result, the instrument cluster hereof is able to display a multitude of information items that would require considerably more space in mechanical dial-type gauges or similar devices. Certain stereoscopic displays that are conventional in the automotive sector require much more space.

The mask is a wavelength-selective filter mask, for example. This filter specifies the directions of the light propagation of the display's individual subpixels by covering or filtering. Individual chromaticities of the pixels are radiated into space at different angles. In this manner, separate images for the two eyes of the viewer are able to be generated, which are assembled into a three-dimensional image by the viewer. The image for the one eye shows a slightly offset viewing angle relative to the image for the other eye.

The display may be a flat screen, for example, in particular a TFT-LCD or plasma display. This display may be equipped with an optical structured mask, which allows partial images to be separated for an autostereoscopic representation.

The display's resolution in the horizontal direction may be greater than 150 dpi (dots per inch) when used in the instrument cluster hereof. In this case, a pixel includes the three colors RGB.

The control unit may control the display for representing a display image such that at least eight autostereoscopic views are representable simultaneously, with the possibility of reflecting the views into a horizontal visual fan. For example, it is possible to generate a plurality of stereoscopic visual fans next to each other and to form a visual zone. A total of six to eight adjacent autostereoscopic views may be included in the visual fan. The horizontal cone angle of the image fan(s) at which an autostereoscopic representation takes place may be greater than 15° and between 25 and 30°, in particular. For example, a cone angle of 27° may be provided. In this manner, it is possible to provide the viewer with a plurality of views at different viewing angles, in which individual paired images are correctly radiated at the individual angles for reassembly into a three-dimensional image. As a result, two views that are at a greater distance from one another are seen in close proximity to the display.

If one moves further away, then the partial views widen as well, and the eyes perceive views that are closer together. The number of views depends on the size of the display. With smaller displays with 4-inch screen dimension, eight views, in particular, may be provided. With larger displays having a 50-inch screen, for instance, 16 or 24 views are also possible.

The cluster instrument may include a device for tracking the eye position, which is connected to the control unit. The mask is displaceable in a plane that extends parallel to the display, and the displacement of the mask is implemented as a function of the signal from the device for tracking the eye position. In this case, it is sufficient to display only two views for the two eyes. The correct angle of reflection will be obtained by controlling the mask position as a function of the eye position.

The display may have a region for displaying the speed and/or the engine speed in the form of a dial-type gauge. Furthermore, it may have areas for displaying the radiator temperature and/or the tank level. All other display functions of a conventional instrument cluster may also be provided by the autostereoscopic display.

The display may have a region for the stereoscopic display of a compass, in which a compass dial is viewed obliquely from above.

A motor vehicle may include the afore-described instrument cluster. In this case, the instrument cluster is disposed underneath the windshield, in particular behind the steering wheel. Furthermore, the motor vehicle may include an operating device, which is connected to the control unit and actuable in three dimensions, the control unit controlling the display unit such that the three-dimensional actuation of the operating device is reproduced autostereoscopically.

Example embodiments of the present invention are described in greater detail below with reference to the appended Figures.

BRIEF DESCRIPTION OF THE DRAWINGS

FIG. 5 shows one of eight views for the stereoscopic display of a menu.

DETAILED DESCRIPTION

It is pointed out that the two-dimensional representations of the enclosed drawings are represented autostereoscopically in three dimensions in the exemplary embodiments of the present invention. Elements of the illustrations are therefore shown three-dimensionally in front of and behind the display plane. By varying the viewing angle, a viewer is also able to view the three-dimensionally represented objects at a limited angular range from the side or from above or below.

Figure 1:
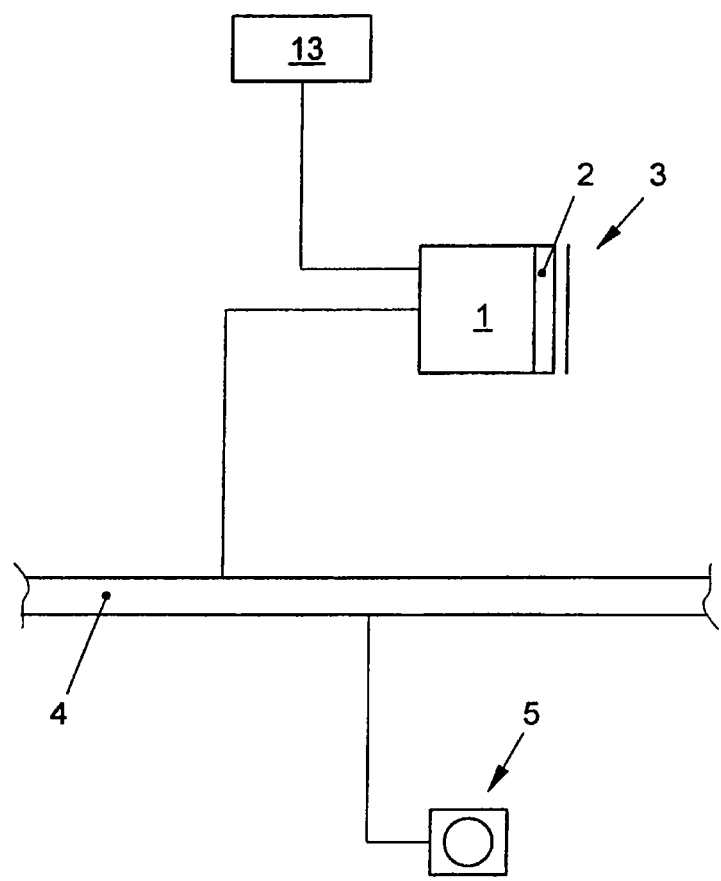
FIG. 1 schematically shows the general configuration of a device according to an exemplary embodiment of the device present invention, FIG. 2 schematically shows the configuration of the display.

The basic arrangement of a device for representing items of information is described with reference to FIG. 1. The device is used in a transportation device, e.g., in a motor vehicle. The device has a control unit 1 as central unit. It controls the display of images displayed by display unit 2, which is connected to control unit 1. Display unit 2 includes a display for the stereoscopic, three-dimensional representation of images. In order to achieve the autostereoscopic effect, a mask 3 is disposed in front of the display, the mask modifying the light emission of the light emitted by the display such that autostereoscopic images are able to be represented. Details in connection with the display unit are described below.

The control unit is connected to a vehicle bus 4. Furthermore, an operating device 5 is connected to vehicle bus 4. Operating device 5 includes an operating element, which is actuable three-dimensionally and is able to control various functions that are implementable in the motor vehicle. The displays assigned to these functions are displayed by display unit 2. To this end, the control unit receives the signals from operating device 5 via vehicle bus 4. The display images allocated to these input signals are loaded from a memory 13 by control unit 1. Control unit 1 thereupon transmits the display data for the autostereoscopic display of the images to display unit 2 where they are reproduced on the display. The functions that are able to be executed by operating device 5 and indicated appropriately by display unit 2 include any functions that are currently indicated and which potentially may be indicated in the future by conventional, two-dimensional display devices of a motor vehicle or some other transportation device. Certain aspects hereof relate to the control of display unit 2 and the representation of the display images as well as to the representation of hierarchical menu structures.

Figure 2:
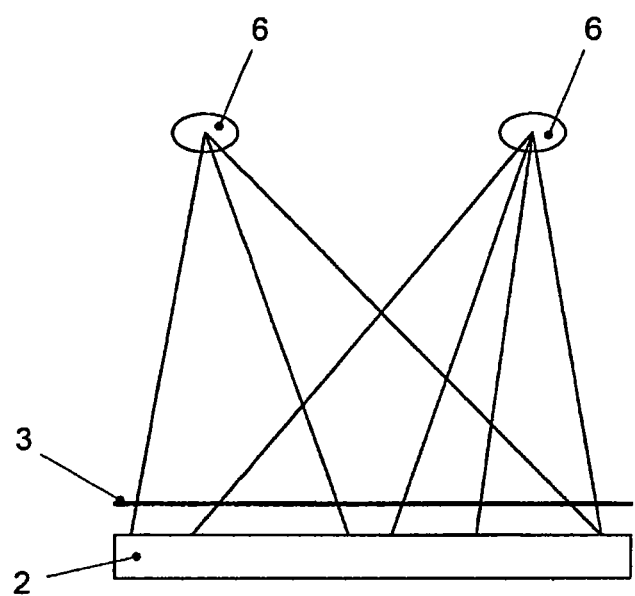

FIG. 2 shows display unit 2, in front of which mask 3 is disposed. Eyes 6 of a viewer are schematically indicated as well. The display of display unit 2 is a conventional TFT-LCD or a plasma display having a multitude of pixels, each pixel having the capacity of representing the three colors red, yellow, blue. Mask 3 is, in particular, a wavelength-selective filter mask or an optical structure mask. The mask makes it possible to distinguish between partial images belonging to different views, and to radiate each view into a different direction. Thus, partial images for the right and for the left eye are able to be separated. When viewing display unit 2, the partial images may be combined to form a three-dimensional view. No additional aids such as glasses, etc., are required. As far as additional details of display unit 2 are concerned, reference is made to German Published Patent Application No. 103 09 194 and German Published Patent Application No. 103 20 530.

Figure 3:
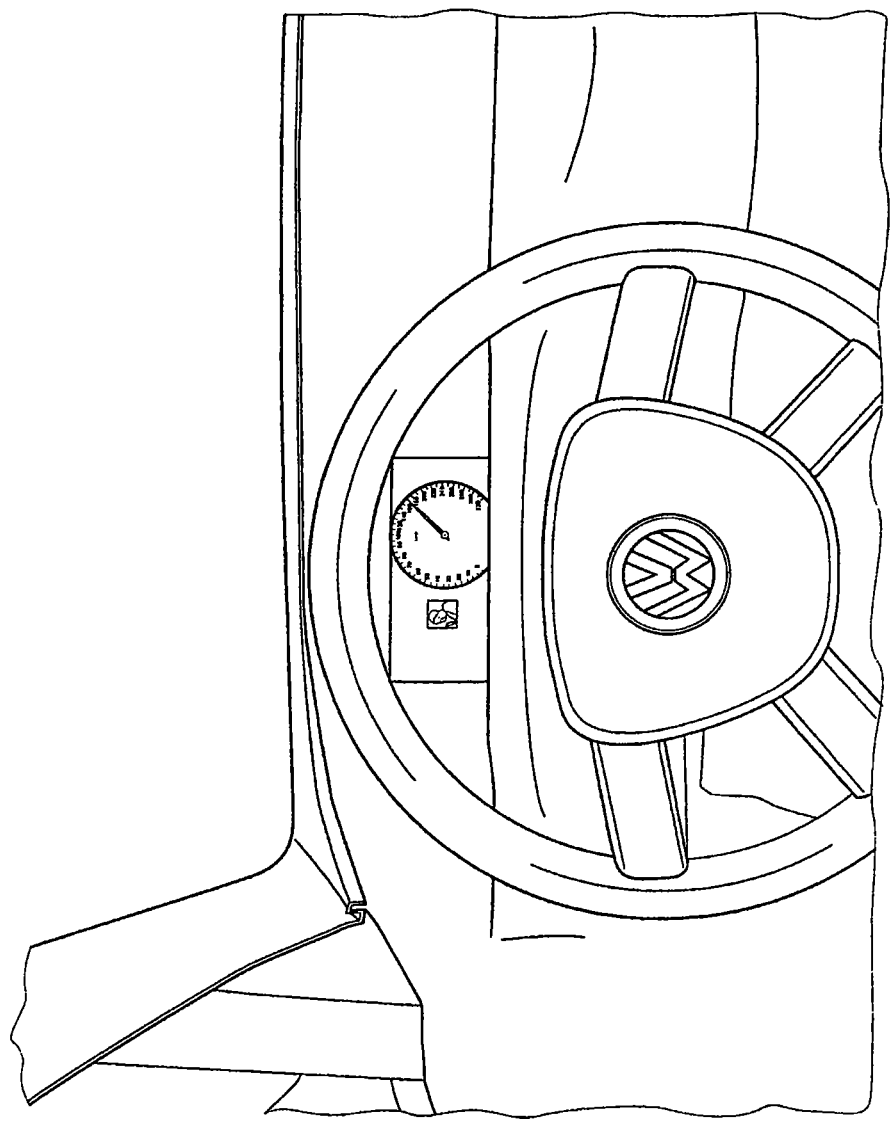
FIG. 3 shows an instrument cluster according to an exemplary embodiment of the present invention, installed in a motor vehicle, FIG. 4 schematically shows the light emission of the display according to an exemplary embodiment.

FIG. 3 shows an instrument cluster in a motor vehicle in which the dial-type gauges, menus and other displays are represented stereoscopically by display unit 2. The instrument cluster is situated in the usual location behind the steering wheel in the cockpit of a motor vehicle.

Figure 4:
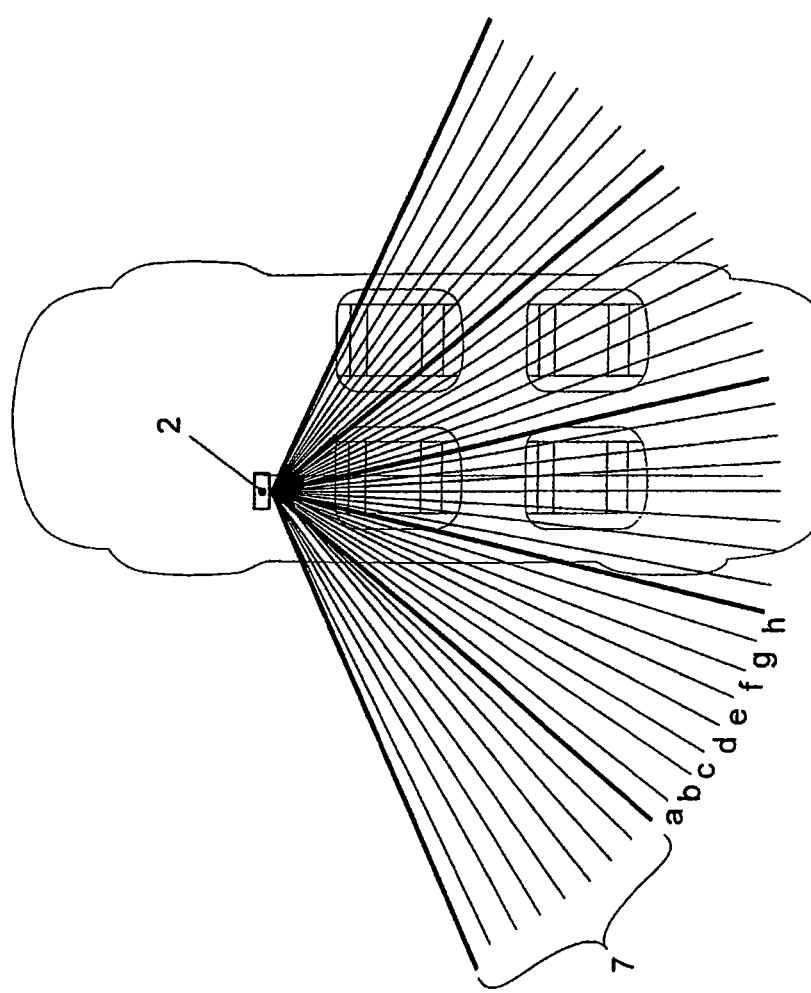

FIG. 4 shows the manner in which a three-dimensional display image is emitted by display unit 2.

The three-dimensional image is produced by a paired image of which the right eye perceives one view and the left eye another. As described, the separation of these partial images is provided with the aid of structure or filter mask 3. However, this image separation is possible only at a particular solid angle. If the viewer moves to the side in a horizontal plane, for instance, the separation of the partial images is canceled and the display becomes two-dimensional. In order to produce as many paired images as possible for an accurate three-dimensional representation in space, a plurality of views is represented for a display image. The partial images of these various views are radiated horizontally, in the approximate shape of a fan, so that horizontal visual fan 7 is created. A total of eight views a through h is selected in the exemplary embodiment. The cone angle of viewing fan 7 amounted to 27°. Eight views may be provided in the case of a 4-inch display. The brightness, resolution and spatial reproduction are sufficient in this case. The resolution of the display is greater than 150 dpi.

To provide all vehicle passengers to obtain a three-dimensional impression, a total of five image fans 7 are placed next to each other. This forms a visual zone in which display images are reproduced in three dimensions. FIG. 5 shows one of views a through h, which are reproduced by display unit 2 for a display image of a menu.

Figure 6:
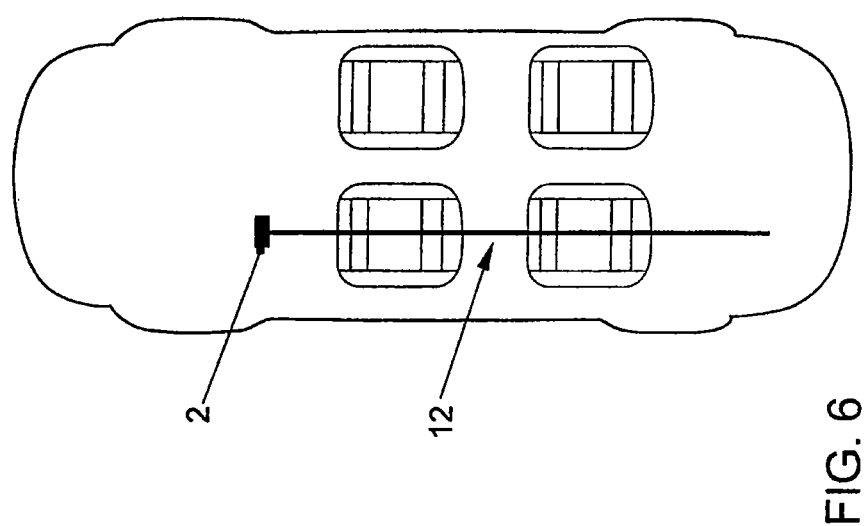
FIG. 6 shows the light emission of the display according to an exemplary embodiment.

FIG. 6 shows another example, in which display unit 2 radiates only two views. In order to provide a three-dimensional view of the display image across a cone angle of approximately 25°, mask 3 is displaceable parallel to the display of display unit 2. Mask 3 is an optical prism mask in this case. Furthermore, this exemplary embodiment provides a device for tracking the eye position, which is connected to the control unit. Via control unit 1 and a suitable drive, mask 3 is displaced as a function of the eye position so as to follow the eye position. The central, three-dimensional line of sight is denoted by 12 in FIG. 6.

Figure 7:
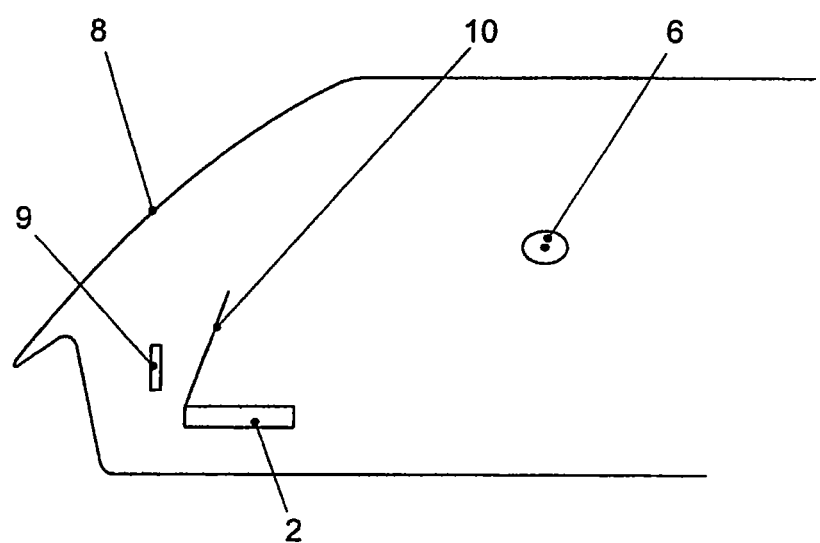
FIG. 7 shows a device according to an exemplary embodiment of the present invention.
Figure 8:
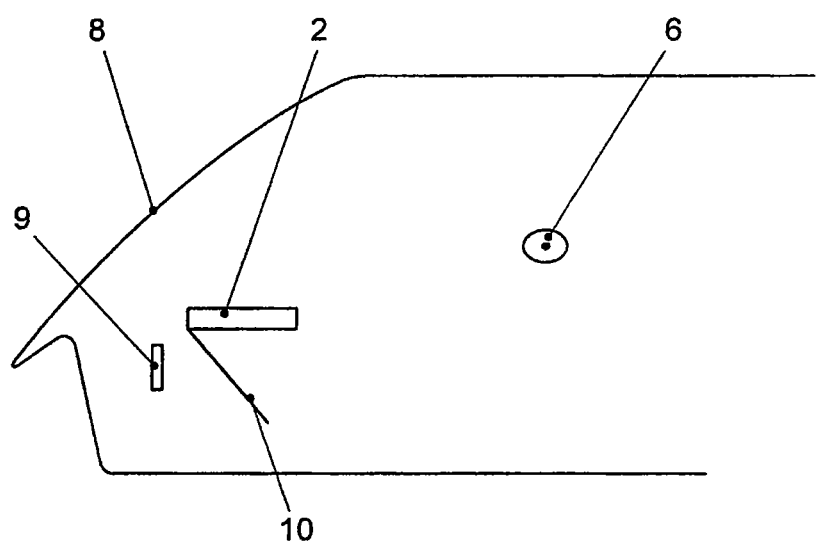
FIG. 8 shows a device according to an exemplary embodiment of the present invention.
Figure 9:
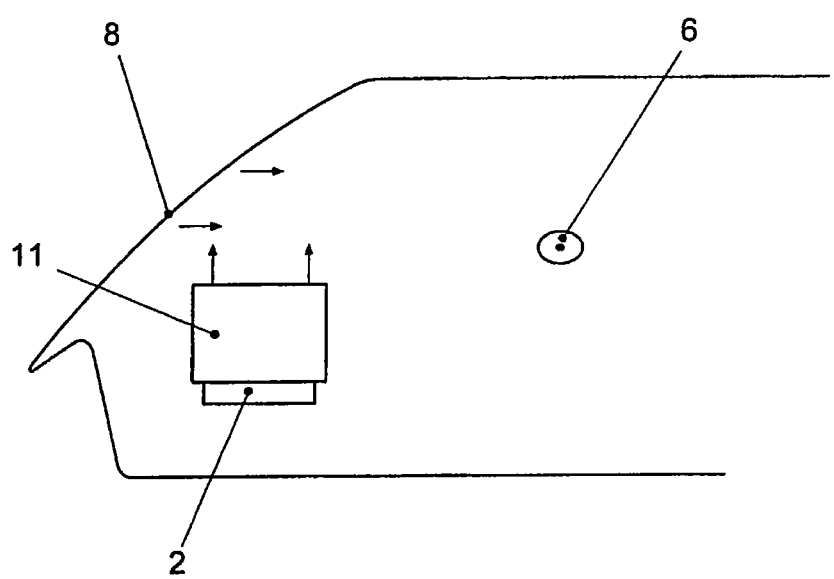
FIG. 9 shows a device according to an exemplary embodiment of the present invention by which a head-up display is provided.

FIGS. 7 through 9 show additional exemplary embodiments of the device. Here, eyes 6 of the viewer see the three-dimensional display image of display unit 2 via a semi-transparent mirror. In the exemplary embodiments shown in FIGS. 7 and 8, semi-transparent mirror 10 is disposed in front of conventional dial-type gauge instruments 9. This allows a three-dimensional display image to be reflected either from below (FIG. 7) or from above (FIG. 8), in front of a conventional instrument cluster or its dial-type gauges.

A so-called head-up display is provided in the example shown in FIG. 9 in that the light emitted by display unit 2 is projected onto windshield 8 via an optics system 11 in order to extend the optical path, the reflection capacity of windshield 8 being sufficient to reveal the three-dimensional display image in windshield 8 to the eyes (6) of the viewer.

Figure 10:
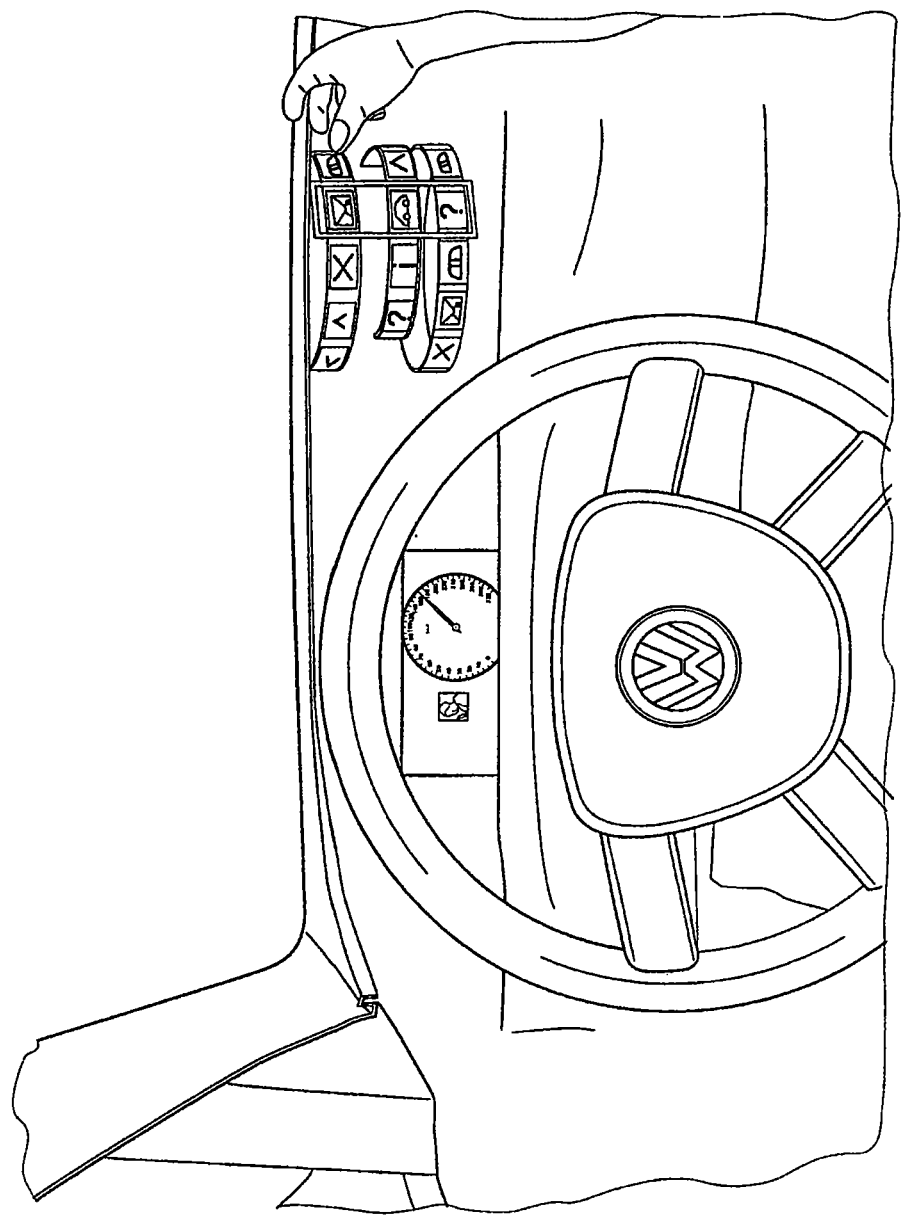
FIG. 10 shows a device according to an exemplary embodiment of the present invention, which displays information in the center console of a vehicle.
Figure 11:
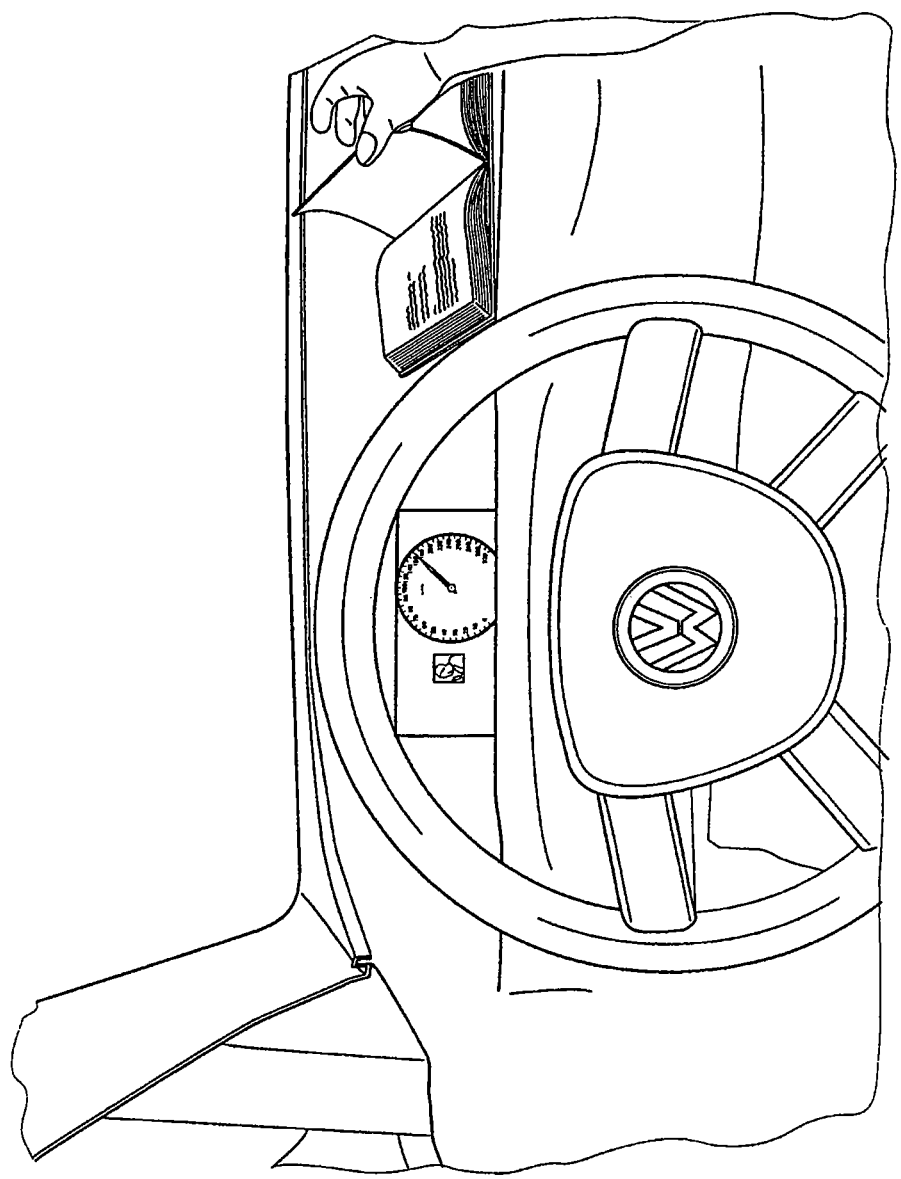
FIG. 11 shows an exemplary embodiment, which corresponds to the exemplary embodiment shown in FIG. 11, but in which a different type of information display is selected, FIG. 12 schematically indicates in which planes various menus according to a method according to an exemplary embodiment of the present invention and according to an instrument cluster of an exemplary embodiment of the present invention are shown.

FIGS. 10 and 11 show additional exemplary embodiments of the device. In the example of FIG. 10, a rotating cylinder, which is represented stereoscopically by display unit 2, is disposed in the center console. As indicated in FIG. 10, the rotation of the cylinder may be controlled by gestures. To this end, hand movements are detected by infrared sensors and converted into a modification of the display image.

In the exemplary embodiment shown in FIG. 11, display unit 2 stereoscopically displays an open book whose pages may be turned by gesture controls.

An exemplary embodiment of the method is described below. The aforementioned devices may be used to implement this method.

In the method, items of information are to be represented in a transportation device, in particular a motor vehicle. The items of information are organized in the form of hierarchical menu structures. In other words, by selecting a menu item it is possible to move from a main menu to a hierarchically lower menu, which in turn includes menu items. The objects assigned to the menus are displayed within the menus or at the end of a hierarchical menu branch. They may be, for example, displays for data related to the operation or traffic.

In the method, the menus are displayed autostereoscopically, at least two different menus or menu items appearing at different distances to the viewer. To this end, the required views for the autostereoscopic display of the menu are stored in memory unit 13. When a menu is called up, these images are loaded by the control unit and transmitted to display unit 2. The images are reproduced on the display of display unit 2 such that a three-dimensional view is created for the viewer.

Figure 12:
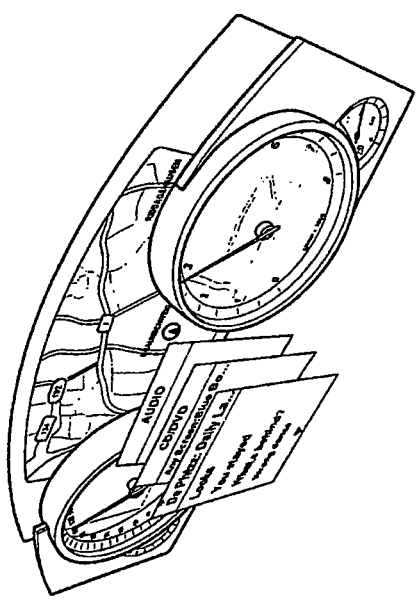
Figure 13:
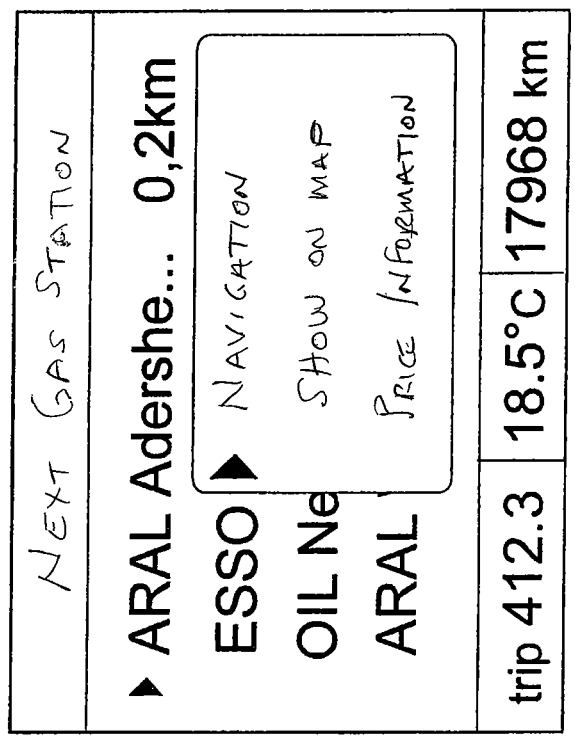
FIG. 13 shows a view of the navigation menu, which is displayed according to an exemplary embodiment of the present invention.

FIG. 12 illustrates how different menus are shown in planes that are offset from the physical display plane in the direction of the viewer. FIG. 13 illustrates how, upon call-up of a menu item, a sub-menu appears, which is displayed in a plane that is offset towards the viewer. It is semi-transparent, so that the menu lying underneath is still visible. Objects or menus or menu items that are of low relevance or importance for the viewer in a specific display image may be displayed blurred, and/or in a plane that is offset away from the viewer.

Figure 14:
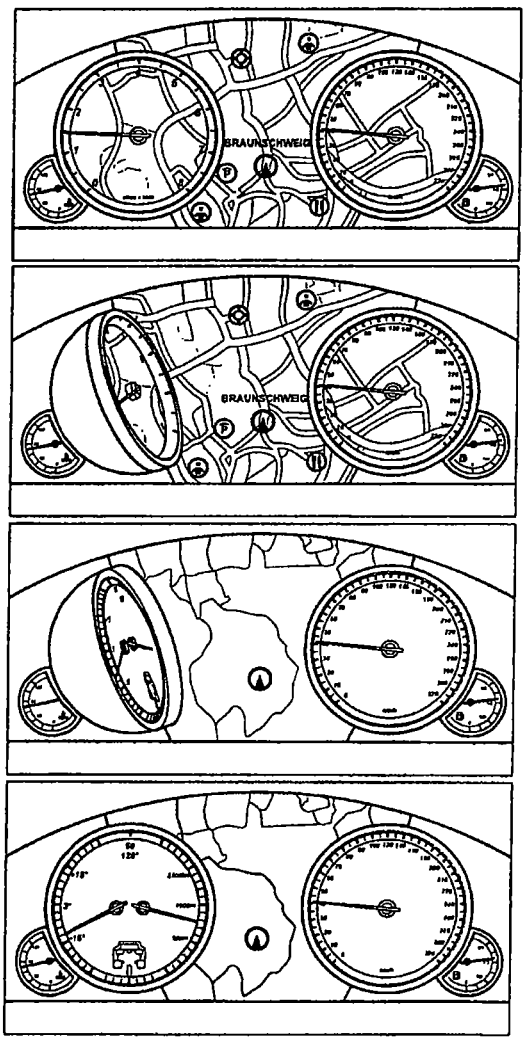
FIG. 14 shows an image sequence, which illustrates an animation according to a method according to an exemplary embodiment of the present invention.

In the transition from one display to another, it is possible to show animations by which a smooth transition from one display to another takes place. The display data for these animations are calculated by control unit 1, or control unit loads the images associated with the animations from memory unit 13. FIG. 14 shows partial images of such an animation. In the first partial image, a map section of the navigation system is shown in the background. Dial-type gauge instruments for the speed and engine speed are shown in three dimensions in a plane offset toward the viewer. Shown in a plane between the dial-type instruments for speed and engine speed and the map of the navigation system are dial-type instruments for the radiator temperature and the fuel level. If, for instance, the dial-type instrument for the engine speed is selected by operating device 5 or by touching of the display, it is rotated about a vertical axis in three dimensions, until the virtual rear side of this dial-type instrument becomes visible, where additional detailed information about the environment of the vehicle is listed. For instance, the driving direction, the road gradient and the altitude are indicated.

Figure 15:
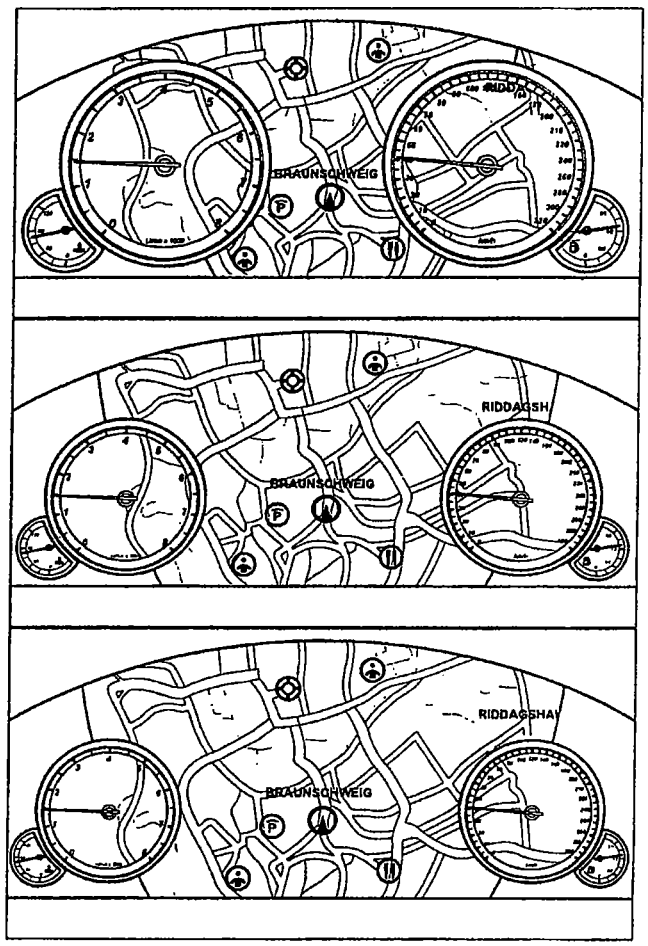
FIG. 15 shows an image sequence having a different animation, which is displayed according to an exemplary embodiment of the present invention.

FIG. 15 shows three partial images of an additional animation. In this case, the navigation system menu item is selected. In response, the dial-type instruments move to the side and are reduced in size in the process, so that a larger portion of the map section shown in the background is displayed.

Figure 16:
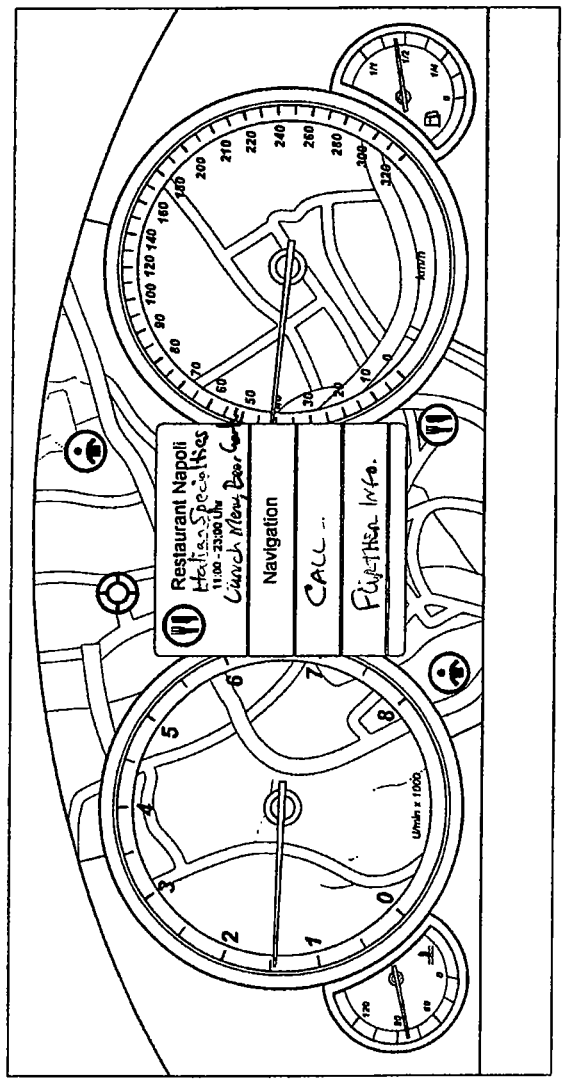
FIG. 16 shows a menu that is displayed according to a method according to an exemplary embodiment of the present invention.

In a selection of menu items of the map sections, such as a special destination (point of interest), a menu is displayable in a plane that is offset in the direction of the viewer and indicates detailed information concerning this location. Such a menu display is shown in FIG. 16.

Figure 17:
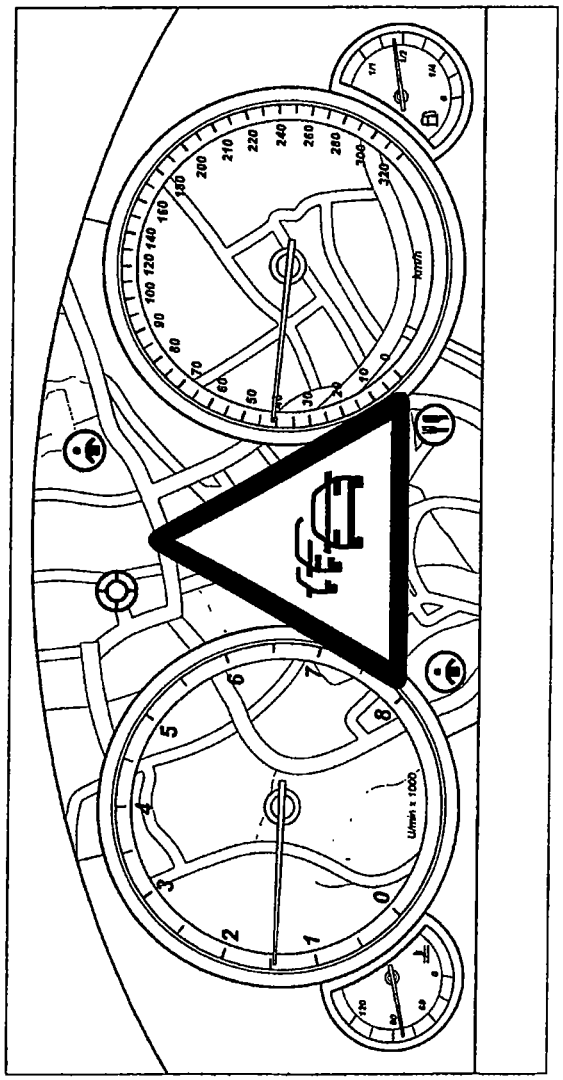
FIG. 17 shows a warning that is displayed according to a method according to an exemplary embodiment of the present invention.

In addition, the method allows warnings to be represented stereoscopically. FIG. 17 shows a warning about traffic congestion, which is displayed in a plane that is offset close to the viewer.

Figure 18:
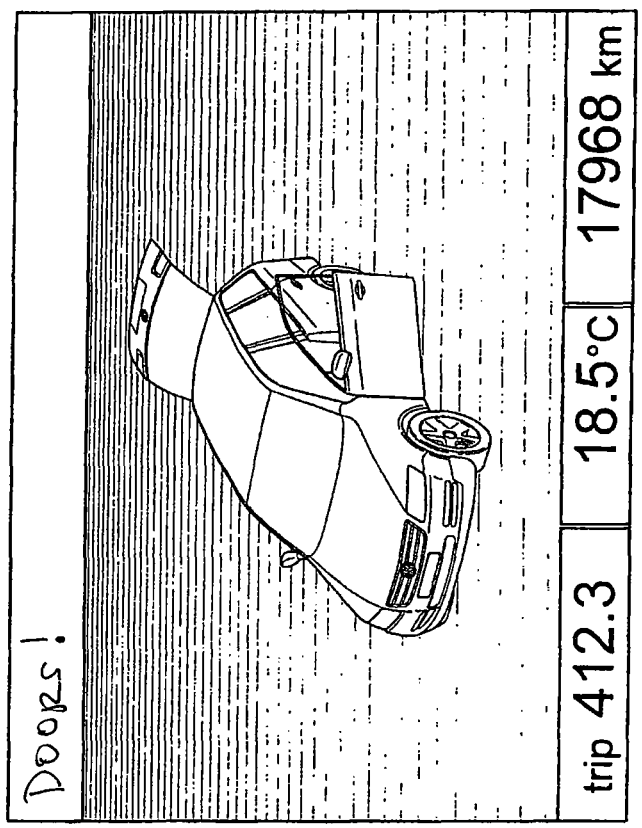
FIG. 18 shows a notice that is displayed according to a method according to an exemplary embodiment of the present invention.

Furthermore, information concerning the vehicle may be displayed in submenus. In doing so, representations of the external environment or the interior of the vehicle are selected by which the information items relevant to the viewer may be gathered in an especially simple and intuitive manner. FIG. 18, for example, shows a stereoscopic representation of a vehicle. In this representation the viewer views the vehicle obliquely from above. The viewer is quickly able to understand the open doors in conjunction with the message "DOORS!".

Figure 19:
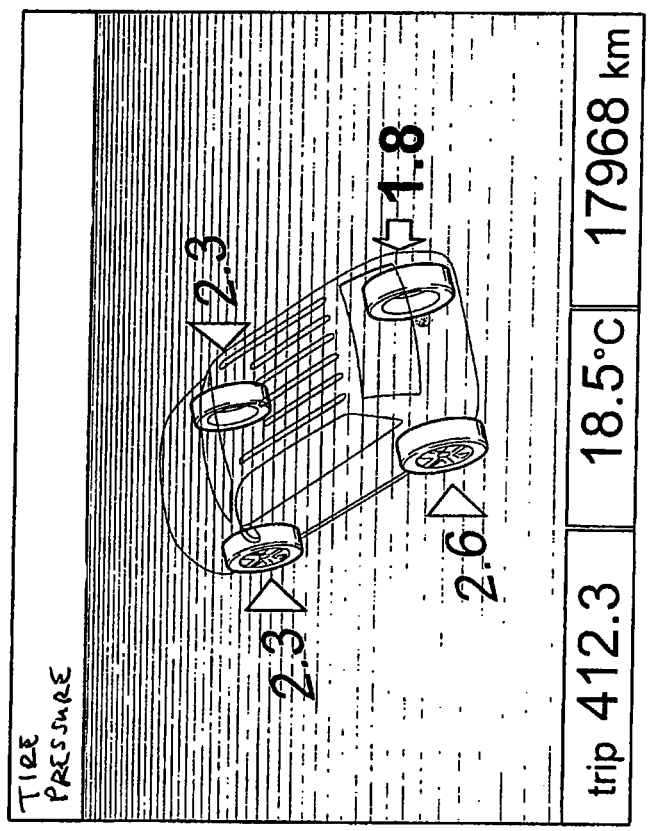
FIG. 19 shows another notice that is displayed according to a method according to an exemplary embodiment of the present invention.
Figure 20:
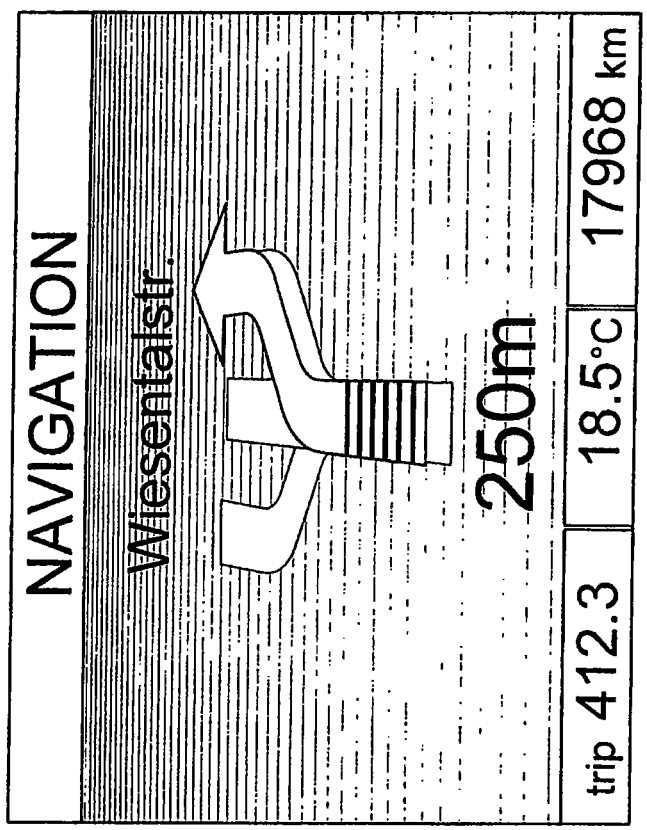
FIG. 20 shows a submenu of the navigation menu, in which the course of the road is displayed as object.

FIG. 19 shows the tires of the vehicle in a highlighted manner, and a warning is provided with the information that the tire pressure in the right rear tire is too low. FIG. 20 shows a submenu of the navigation system. The course of the road as it reveals itself to the viewer in the real world is shown stereoscopically, the route to be selected being shown in three dimensions above the displayed road course.

Figure 21:
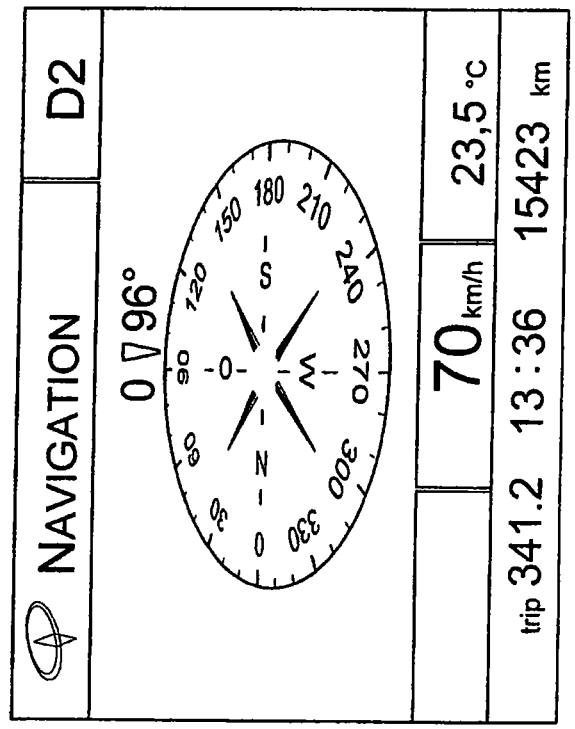
FIG. 21 shows a compass representation according to a method according to an exemplary embodiment of the present invention.

FIG. 21 shows a compass display of the navigation system, in which a compass dial is viewed obliquely from above, the dial being shown in three dimensions. The three-dimensional display of the compass results in a better mental conversion of the display into the driving environment by the driver.

LIST OF REFERENCE NUMERALS

1 Control unit
2 Display unit
3 Mask
4 Vehicle bus
5 Operating device
6 Eyes of a viewer
7 Image fans
8 Windshield
9 Dial-type gauge instrument
10 Semi-transparent mirror
11 Device for extending the optical path
12 Line of sight for three-dimensional viewing
13 Memory unit

What is claimed is:

1. A method for displaying items of information in a transportation device, comprising:
stereoscopically representing the items of information in the form of hierarchical menu structures on a display device; wherein information concerning a part of the transportation device is displayed in the representing step by moving the stereoscopic representation of the part into a visual field of a viewer from a direction of the part in the transportation device;
displaying at least two different menus or menu items at different distances to a viewer;
displaying the menus or the menu items in the representing step in at least one plane that is offset in a direction of the viewer relative to a physical display plane of the display device; and
in response to selecting a menu item of the at least two different menus or menu items, displaying at least one submenu in a first plane and the selected menu or menu item in a second plane, the first plane offset in a direction toward the viewer from the physical display plane and the second plane offset in a direction away from the viewer from the physical display plane; wherein in response to the selection of the menu item, the submenu is opened in a plane that is rotated about an axis until a surface of the submenu is displayed in a plane parallel to the physical display plane; and
varying, in real time, the distances that each of the first and second planes are offset from the physical display plane, wherein the distance that the first plane is offset varies inversely with the relevance of the at least one menu or menu item displayed in the first plane to the current operation of the transportation device, and wherein the distance that the second plane is offset varies inversely with the relevance of the at least one other menu or menu item displayed in the second plane to the current operation of the transportation device;
wherein the menu is selectable by touching the display at a virtual key, the key being displayed offset away from a viewer after the touching.

2. The method according to claim 1, wherein the menus or the menu items that are offset toward the viewer are displayed in the representing step semi-transparently.

3. The method according to claim 1, wherein the menus or the menu items offset away from the viewer are displayed in the representing step blurred.

4. The method according to claim 1, wherein the axis of rotation is aligned one of (a) vertically and (b) horizontally.

5. The method according to claim 1, wherein the menus are disposed on surfaces of a stereoscopically displayed cube.

6. The method according to claim 1, wherein the menus are disposed on inner surfaces of a stereoscopically displayed hollow cube.

7. The method according to claim 1, wherein the menus are disposed on a surface of a stereoscopically displayed sphere.

8. The method according to claim 1, wherein the menus are disposed on a stereoscopically displayed rotating cylinder.

9. The method according to claim 1, wherein the menus are disposed on a stereoscopically displayed rotating ring.

10. The method according to claim 1, wherein the menus are disposed on the pages of a stereoscopically displayed open book.

11. The method according to claim 1, wherein menu items are selectable by gestures.

12. The method according to claim 1, wherein menu items are selectable by touching a display for the stereoscopic representation.

13. The method according to claim 1, wherein information is displayed in the representing step on a surface that is aligned perpendicular to a line of sight of a view, and detailed information associated with the information is displayed in the representing step on a rear side of the surface, the rear side becoming visible to the viewer by a 180° stereoscopic rotation of the surface.

14. The method according to claim 1, wherein three-dimensional movements of an operating device are reproduced in three dimensions in accordance with the stereoscopic representation.

15. The method according to claim 1, wherein the representing step includes displaying stereoscopically at least one of (a) a speed and (b) an engine speed in the form of a dial-type gauge.

16. The method according to claim 1, wherein the representing step includes displaying stereoscopically at least one of (a) a radiator temperature and (b) a fuel level the form of a dial-type gauge.

17. The method according to claim 1, wherein a menu includes a stereoscopic eye point representation of at least one of (a) the transportation device and (b) a part of the transportation device.

18. The method according to claim 1, wherein at least one menu includes a stereoscopic representation of an interior of the transportation device, in which light, audio and climate control sources in the interior are shown.

19. The method according to claim 1, wherein at least one menu includes the stereoscopic representation of a compass.

20. The method according to claim 19, wherein the representation of the compass includes a stereoscopically displayed disk, which is viewed obliquely from above.

21. The method according to claim 1, wherein the displays are implemented autostereoscopically.

22. The method according to claim 1, further comprising:
displaying a warning notification in a third plane offset from the physical plane at a distance greater than the distance of the first plane from the physical plane and greater than the distance of the second plane from the physical plane.

23. The method according to claim 1, further comprising:
displaying a dial-type gauge for vehicle speed or engine speed in a fourth plane offset from the first plane.

24. A device for displaying items of information in a transportation device, comprising:
a display unit configured to at least one of (a) stereoscopically and (b) autostereoscopically display of items of information in the form of a hierarchical menu structure; wherein information concerning a part of the transportation device is displayed by moving the one of the (a) stereoscopically and (b) autostereoscopically representation of the part into a visual field of a viewer from a direction of the part in the transportation device; wherein after the selection of the menu item, wherein in response to the selection of the menu item, the submenu is opened in a plane that is rotated about an axis until a surface of the submenu is displayed in a plane parallel to the physical display plane; and a control unit configured to determine the display of menus such that at least two different menus or menu items are displayed by the display unit at different distances to a viewer;

wherein in response to selecting a menu item of the at least two different menus or menu items, a submenu is displayed in a first plane and the selected menu or menu item is displayed in a second plane, wherein the first plane is offset in a direction toward the viewer from a physical display plane of the display unit, and the second plane is offset in a direction away from the viewer from the physical display plane of the display unit wherein the distances that the first plane is offset from the physical display plane is varied, in real time, inversely with the based on a relevance of the at least one menu or menu item displayed in the first plane to the current operation of the transportation device, and wherein the distance that the second place is offset from the physical display plane is varied, in real time, inversely with the relevance of the at least one other menu or menu item displayed in the second plane to the current operation of the transportation device;

wherein the menu is selectable by touching the display at a virtual key, the key being displayed offset away from a viewer after the touching.

25. A motor vehicle, comprising:
a device configured to display items of information, the device including:
a display unit configured to at least one of (a) stereoscopically and (b) autostereoscopically display of items of information in the form of a hierarchical menu structure; wherein information concerning a part of the transportation device is displayed by moving the one of the (a) stereoscopically and (b) autostereoscopically representation of the part into a visual field of a viewer from a direction of the part in the transportation device; and a control unit configured to determine the display of menus such that at least two different menus or menu items are displayed by the display unit at different distances to a viewer;

wherein in response to selecting a menu item of the at least two different menus or menu items, a submenu is displayed in a first plane and the selected menu or menu item is displayed in a second plane, wherein the first plane is offset in a direction toward the viewer from a physical display plane of the display unit, and the second plane is offset in a direction away from the viewer from the physical display plane of the display unit wherein in response to the selection of the menu item, the submenu is opened in a plane that is rotated about an axis until a surface of the submenu is displayed in a plane parallel to the physical display plane;

wherein the distances that the first plane is offset from the physical display plane is varied, in real time, inversely with the based on a relevance of the at least one menu or menu item displayed in the first plane to the current operation of the transportation device, and wherein the distance that the second place is offset from the physical display plane is varied, in real time, inversely with the relevance of the at least one other menu or menu item displayed in the second plane to the current operation of the transportation device;

wherein the menu is selectable by touching the display at a virtual key, the key being displayed offset away from a viewer after the touching.

26. The motor vehicle according to claim 25, wherein the display unit is arranged behind a steering wheel in a viewing direction of a driver.

27. The motor vehicle according to claim 25, further comprising a mirror arranged to reflect the display of the display unit in the direction of the viewer.

28. The motor vehicle according to claim 27, wherein the mirror is semi-transparent and arranged between a driver and additional display instruments.

29. The motor vehicle according to claim 27, wherein the display unit is arranged one of (a) above and (b) below the mirror.

30. The motor vehicle according to claim 27, wherein the display unit is arranged such that the display is reflected toward the viewer via a windshield.

31. The motor vehicle according to claim 30, further comprising an optics system, configured to extend an optical path, arranged between the display unit and the windshield.

32. The motor vehicle according to claim 25, further comprising an operating device connected to the control unit and actuatable in a three-dimensional manner, the control unit configured to control the display unit to autostereoscopically reproduce the three-dimensional actuation of the operating device.

* * * * *